United States Patent [19]

Suga

[11] Patent Number: 5,178,106

[45] Date of Patent: Jan. 12, 1993

[54] VALVE TIMING CONTROL APPARATUS

[75] Inventor: Seiji Suga, Kanagawa, Japan

[73] Assignee: Atsugi Unisia Corporation, Kanagawa, Japan

[21] Appl. No.: 661,695

[22] Filed: Feb. 27, 1991

[30] Foreign Application Priority Data

Feb. 28, 1990 [JP] Japan .................................. 2-47744

[51] Int. Cl.⁵ .............................................. F01L 1/34
[52] U.S. Cl. .............................. 123/90.17; 123/90.31; 464/2
[58] Field of Search ............... 123/90.12, 90.15, 90.17, 123/90.31; 464/2

[56] References Cited

U.S. PATENT DOCUMENTS

| 4,305,352 | 12/1981 | Oshima et al. | 123/90.15 |
| 4,535,731 | 8/1985 | Banfi | 123/90.15 |
| 4,895,113 | 1/1990 | Speier et al. | 123/90.17 |
| 5,002,023 | 3/1991 | Butterfield et al. | 123/90.31 |

FOREIGN PATENT DOCUMENTS

8910469 11/1989 Int'l Pat. Institute .
9008248 7/1990 Int'l Pat. Institute .

Primary Examiner—E. Rollins Cross
Assistant Examiner—Weilun Lo
Attorney, Agent, or Firm—Bachman & LaPointe

[57] ABSTRACT

A valve timing control apparatus for use in an internal combustion engine having a crankshaft driven by the engine and a camshaft adapted to drive at least one valve. The control apparatus comprises a rotary member drivingly connected to the crankshaft for rotation with rotation of the crankshaft. A desired angular position of the camshaft with respect to the rotary member is calculated based upon engine operating conditions. The rotary member is coupled to the camshaft through a coupling mechanism which sets the camshaft at the desired angular position with respect to the rotary member. The coupling mechanism makes this angular position setting in response to torque changes in the camshaft.

7 Claims, 6 Drawing Sheets

VALVE TIMING CONTROL APPARATUS

BACKGROUND OF THE INVENTION

This invention relates to a valve timing control apparatus for use in an internal combustion engine to provide a desired valve timing(s) according to engine operating conditions.

In an article, Motor Fan, Vol. 43, No. 10, pp. 38 and 119, published Oct. 1, 1989, by Saneishobo Inc., there is described a valve timing control apparatus for controlling the intake or exhaust valve timing according to engine operating conditions. The valve timing control apparatus employs a cylindrical gear having internal and external threaded portions one of which is taken in the form of a helical gear. The external threaded portion engages with the inner thread portion of a rotary drum which is formed on its outer peripheral surface with sprocket teeth for engagement with a timing chain engaging with a sprocket mounted on the crankshaft of the engine. The internal threaded portion of the cylindrical gear engages with the external threaded portion formed on the camshaft of the engine. The camshaft is rotated at an angle with respect to the rotary drum by applying fluid pressures to move the cylindrical gear in an axial direction of the camshaft.

However, the conventional valve timing control apparatus employs an expensive helical gear. The helical gear is required to be machined with high accuracy sufficient to provide smooth valve timing control. Additionally, the conventional valve timing control apparatus operates at a slow response rate with respect to engine operating condition changes since the cylindrical gear movement will lag because of the frictional resistances between the cylindrical gear and the internal threaded portion of the rotary drum and between the cylindrical gear and the external threaded portion of the camshaft. Still further, the conventional valve timing control apparatus switches the fluid pressures acting on the front and rear surfaces of the cylindrical gear in an on-off manner to place the camshaft at one of two angular positions with respect to the rotary drum. It is, therefore, difficult, if not impossible, to place the camshaft at a desired angular position between these two angular positions.

SUMMARY OF THE INVENTION

Therefore, it is a main object of the invention to provide an improved valve timing control apparatus which can provide a desired valve timing optimum to the existing engine operating conditions.

Another object of the invention is to provide an expensive valve timing control apparatus which has a rapid response rate with respect to engine operating condition changes.

There is provided, in accordance with the invention, a valve timing control apparatus for use in an internal combustion engine having a crankshaft driven by the engine and a camshaft adapted to drive at least one valve. The valve timing control apparatus comprises a rotary member drivingly connected to the crankshaft for rotation with rotation of the crankshaft, a control unit responsive to engine operating conditions for calculating a desired angular position of the camshaft with respect to the rotary member, and a coupling mechanism for coupling the rotary member to the camshaft to transmit rotation of the rotary member to the crankshaft. The coupling mechanism includes means for setting the camshaft at the desired angular position with respect to the rotary member. The camshaft setting means makes the setting in response to torque changes in the camshaft.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
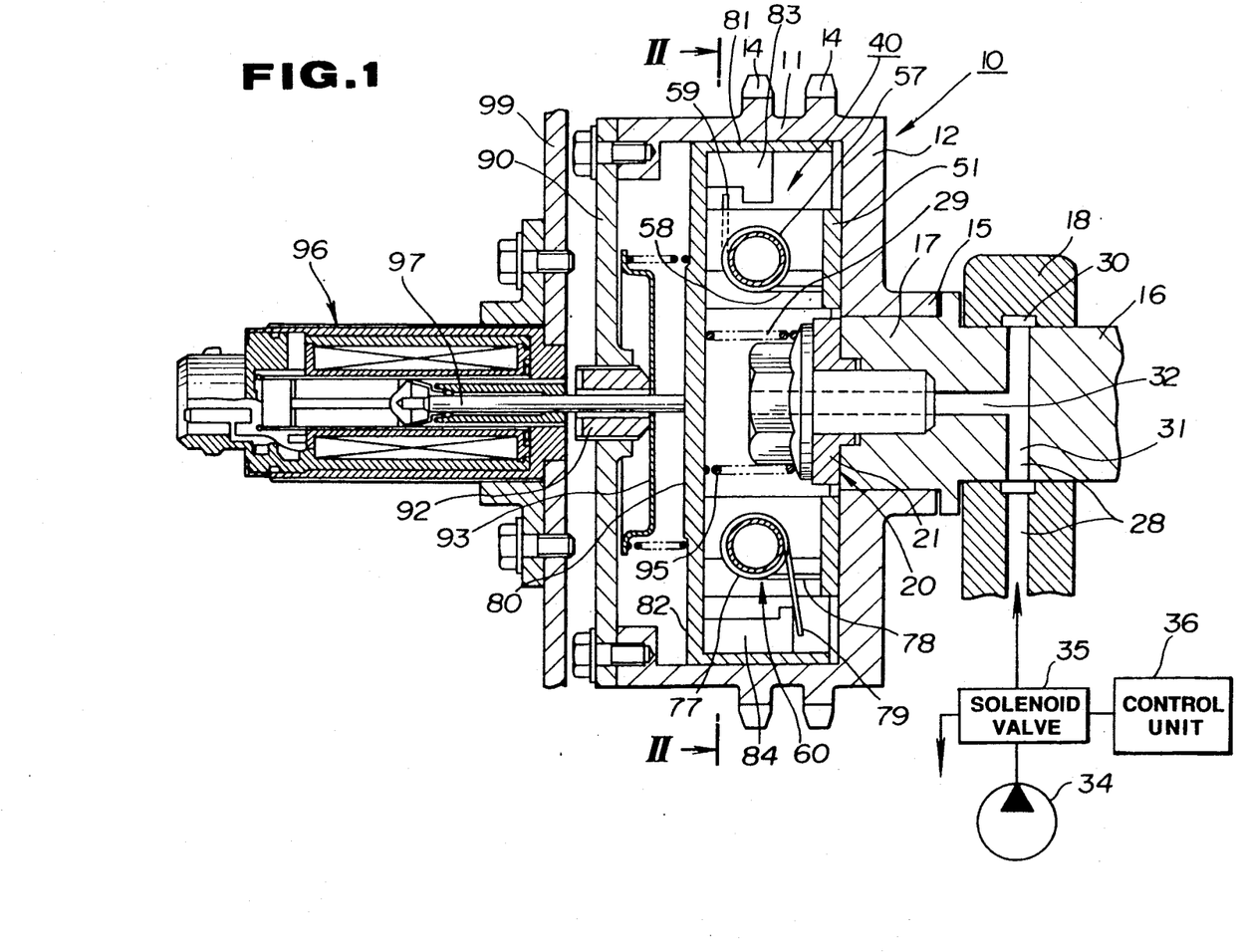
FIG. 1 is a fragmentary longitudinal sectional view showing a first embodiment of a valve timing control apparatus made in accordance with the invention.
Figure 2:
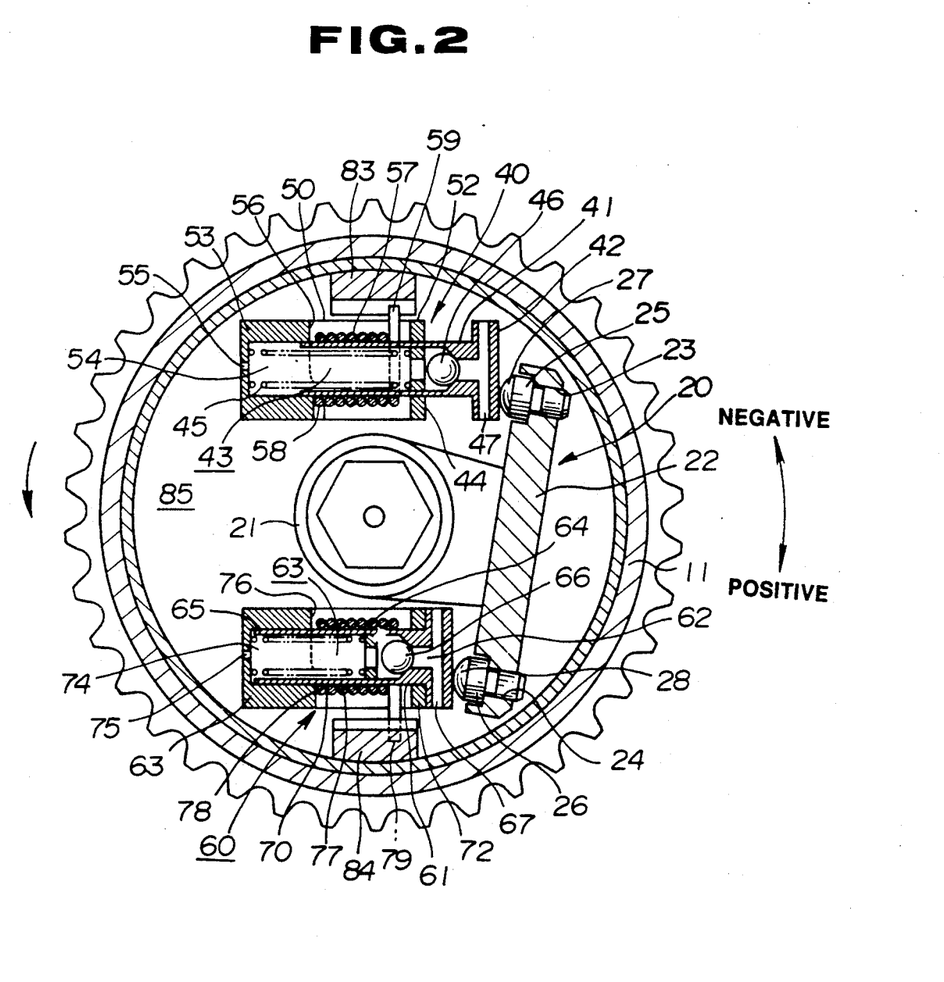
FIG. 2 is a transverse sectional view taken on line II—II of FIG. 1.

With reference to the drawings and in particular to FIGS. 1 and 2, there is shown a valve timing control apparatus embodying the invention. In the illustrated case, the valve timing control apparatus is applied to a DOHC engine for use in automotive vehicles. The valve timing control apparatus comprises a rotary drum 10 located on one end 17 of a camshaft 16. The camshaft 16 is supported by a bearing 18 for rotation to drive unshown cams so as to open and close the respective intake valves of the engine. The bearing 18 forms a part of the cylinder head of the engine. The rotary drum 10 has a cylindrical peripheral wall 11, a circular front end wall 12, and an annular rear end wall 13, all formed integrally. The peripheral wall 11 is formed on its outer peripheral surface with sprocket teeth 14 arranged in a pair of parallel lines for engagement with a timing chain (not shown). The timing chain engages with a drive sprocket mounted on the crankshaft (not shown) for transmitting rotation of the crankshaft to rotate the rotary drum 10 at half the speed of the crankshaft. The front end wall 12 is formed with a central boss 15 having a central aperture in which the one end 17 of the camshaft 16 is placed for sliding rotation.

The camshaft 16 has a rocker arm 20 which is secured to its end surface for rotation in unison with the camshaft 16 by means of a bolt 29 extending in alignment with the axis of the camshaft 16. The bolt 29 has a threaded central bore formed in the end 17 of the camshaft 16. The rocker arm 20 has a root portion 21 fixed on the end surface of the camshaft 16, and an arm portion 22 connected integrally to the root portion 21 intermediate its ends. The arm portion 22 extends in a direction normal to the camshaft 16. The arm portion 22 is formed near its opposite ends with openings 23 and 24 which fixedly receive knockers 25 and 26 having semi-spherical surfaces 27 and 28, respectively.

The bearing 18 has an annular conduit 30 connected to a radial conduit 31 formed in the camshaft 16 having an axial conduit 32 connected to the radial conduit 31 intermediate its ends. The axial conduit 32 extends through the bolt 29 and opens into the interior of the rotary drum 10. The annular conduit 30 is also connected to a pump 34 through a solenoid valve 35 controlled by a control unit 36.

The numerals 40 and 60 designate first and second clutch mechanisms. The first clutch mechanism 40 includes a piston rod 41 supported for sliding movement in a direction substantially parallel to the camshaft 16 by a support member 50 having a side wall 51 (FIG. 2) fixed to the inner surface of the front end wall 12. The piston rod 41 has a large-diameter head 42 secured its front end for engagement with the semi-spherical surface 27 of the knocker 25. The support member 50 has front and rear walls 52 and 53 extending from the fixed side wall 51. The front wall 52 is formed with a central circular opening having a size suitable for insertion of the piston rod 41. The rear wall 53 is formed with a central bore 54 having a size suitable for insertion of the piston rod 41. The rear wall 53 is formed with a central bore 54 having a size suitable for insertion of the piston rod 41. The central bore 54 is closed at its rear end and connected through a restriction orifice 55 to the interior of the rotary drum 10. The piston head 42 comes in abutment with the front wall 52 during its retracting movement. Thus, the front wall 52 constitutes the limit of piston rod retracting movement. The piston rod 41 has an axial bore 43 having an annular intermediate wall 44 to form front and rear chambers on the opposite sides thereof. A compression spring 45 is retained in the rear chamber to urge the piston rod 41 to the right, as viewed in FIG. 2. A check valve 46 is provided in the front chamber to permit flow from the front chamber to the rear chamber but not vice versa. The front chamber is connected to a radial conduit 47 extending through the piston head 42. The piston rod 41 is surrounded by a coil spring 57 between the front and rear walls 52 and 53. The coil spring 57 is fixed at its one end 58 to the front surface of the rear wall 53 of the support member 50. The other end 59 of the coil spring 57 is projected outwardly from the support member 50. The rear wall 53 has a cutout 56 for permit movement of the coil spring 57 over its one end 58. The coil spring 57 is normally held in contact with the outer peripheral surface of the respective piston rod 41 to provide a frictional force against movement of the piston rod 41. When the coil spring 57 is compressed, it provides an increased frictional force against movement of the piston rod 41.

Similarly, the second clutch mechanism 60 includes a piston rod 61 supported for sliding movement in a direction substantially parallel to the camshaft 16 by a support member 70 having a side wall 71 (FIG. 2) fixed to the inner surface of the front end wall 12. The piston rod 61 has a large-diameter head 62 secured its front end for engagement with the semi-spherical surface 27 of the knocker 25. The support member 70 has front and rear walls 72 and 73 extending from the fixed side wall 71. The front wall 72 is formed with a central circular opening having a size suitable for insertion of the piston rod 61. The rear wall 73 is formed with a central bore 74 having a size suitable for insertion of the piston rod 61. The central bore 74 is closed at its rear end and connected through a restriction orifice 75 to the interior of the rotary drum 10. The piston head 62 comes in abutment with the front wall 72 during its retracting movement. Thus, the front wall 72 constitutes the limit of piston rod retracting movement. The piston rod 61 has an axial bore 63 having an annular intermediate wall 64 to form front and rear chambers on the opposite sides thereof. A compression spring 65 is retained in the rear chamber to urge the piston rod 61 to the right, as viewed in FIG. 2. A check valve 66 is provided in the front chamber to permit flow from the front chamber to the rear chamber but not vice versa. The front chamber is connected to a radial conduit 67 extending through the piston head 62. The piston rod 61 is surrounded by a coil spring 77 between the front and rear walls 72 and 73. The coil spring 77 is fixed at its one end 78 to the front surface of the rear wall 73 of the support member 70. The other end 79 of the coil spring 77 is projected outwardly from the support member 70. The rear wall 73 has a cutout 76 for permit movement of the coil spring 77 over its one end 78. The coil spring 77 is normally held in contact with the outer peripheral surface of the respective piston rod 61 to provide a frictional force against movement of the piston rod 61. When the coil spring 77 is compressed, it provides an increased frictional force against movement of the piston rod 61.

A slider 80 is placed for sliding movement within the rotary drum 10. The slider 80 has a cylindrical peripheral wall 81 and a circular rear end wall 82 formed integrally with the peripheral wall 81. The peripheral wall 81 is placed for sliding contact with the inner surface of the peripheral wall 11 to form a pressure chamber 85 defined between the rear end wall 82 and the front end wall 12. The slider 80 has a first hook member 83 secured thereto for engagement with the end 59 of the coil spring 57 and a second hook member 84 secured thereto for engagement with the end 79 of the coil spring 77. The first hook member 83 comes into abutment against the coil spring 57 to push the end 59 in a direction loosing the coil spring 57 when the slider 80 is retracted or moved to the left, as viewed in FIG. 1. The second hook member 84 comes into abutment against the coil spring 77 in a manner to push its end 79 in a direction loosing the coil spring 77 when the slider 80 is advanced or moved to the right, as viewed in FIG. 1.

A circular cover member 90 is bolted to the annular rear end wall 13 of the rotary drum 10. The cover member 90 has an inner threaded center opening for threaded engagement with an adjustment screw 92. The adjustment screw 92 has a cap-shaped stopper member 93 fixed to its front end. The slider rear end wall 82 comes into abutment against the stopper member 93 during its retracting movement. Thus, the stopper member 93 constitutes the limit of slider retarding movement. A compression spring 94 is retained between the stopper member 93 and the slider rear end wall 82 to urge the slider 80 to the right, as viewed in FIG. 1. A compression spring 95 is retained between the bolt 29 and the slider rear end wall 82 to urge the slider 80 to the left, as viewed in FIG. 1. The adjustment screw 92 is used to adjust the resilient force of the compression spring 94 to a value substantially the same as the resilient force the compression spring 95.

The numeral 96 designates an solenoid actuator bolted on a rocker cover 99. The solenoid actuator 96 has a plunger 97 extending through the adjustment screw 92 and the stopper member 93 to the rear end wall 82 of the slider 80 to advance the slider in response to a control signal fed thereto from the control unit 36. The control unit 36 also produces a control signal to the solenoid valve 35 to retract the slider 80. For this purpose, the control unit 36 receives signals indicative of engine operating conditions from a crankshaft position sensor, an airflow meter, etc for calculating a desired valve timing and the corresponding angular position of the camshaft 16 with respect to the rotary drum 10. The control unit 36 also receives signals from angular sensors associated with the camshaft 16 and the rotary drum 10, respectively, for detecting the arrival of the camshaft 16 at the calculated desired angular position with respect to the rotary drum 10.

The operation is as follows: When the engine is operating at a low load condition, the control unit 36 produces a control signal causing the solenoid valve 35 to interrupt communication between the pressure chamber 85 and the pump 34 and also a control signal causing the solenoid actuator 96 to be connected to a power source. As a result, the plunger 97 is advanced to move the slider 80 to a position, as shown in FIG. 1, where the first hook member 83 is out of engagement with the coil spring end 59 and the second hook member 84 pushes the coil spring end 79 in a direction loosing the coil spring 77. In this position, the piston rod 61 is free to slide with respect to the support member 70.

When each cam starts closing the corresponding intake valve, a torque is produced in the camshaft 16 to rotate the rocker arm 20 in a positive direction bringing the knocker 26 into abutment against the piston head 62. As a result, the piston rod 61 is retracted against the resilient force of the compression spring 65 until the piston head 62 comes in abutment with the front wall 72 since the coil spring 77 is loosed to allow free movement of the piston rod 61 with respect to the support member 70. The speed of the retracting movement of the piston rod 61 is limited by the flow resistance of the fluid passing the restriction orifice 75. This is effective to minimize noise and wear which may occur when the knocker 26 knocks the piston head 62. On the other hand, the resilient force of the compression spring 45 advances the piston rod 41, against the frictional force applied to the piston rod 41 by the coil spring 57, to bring the piston head 42 into abutment against the knocker 25. During this movement of the piston rod 41, the fluid flows from the pressure chamber 85 through the check valve 46 into the rear chamber.

When the cam starts opening the intake valve, the direction of the torque in the camshaft 16 is abruptly reversed to a negative direction. This sudden reversal of torque results in a force causing the knocker 25 to push the piston head 42 in a direction retracting the piston rod 41. With the retracting movement of the piston rod 41, the coil spring 57 moves, under the frictional force, and it is compressed to produce tensile stresses in a direction where the coil spring 57 is wound so as to increase the frictional force applied to the piston rod 41. This tendency is increased when the coil spring 57 moves into the cutout 56 and is deformed from an initial cylindrical shape into a conical shape. The frictional force applied to the piston rod 41 will increase as the force applied to the piston head 42 from the rocker arm 20 increases. This ensures that the coil spring 57 will prevent the piston rod 41 from retracting.

Figure 3:
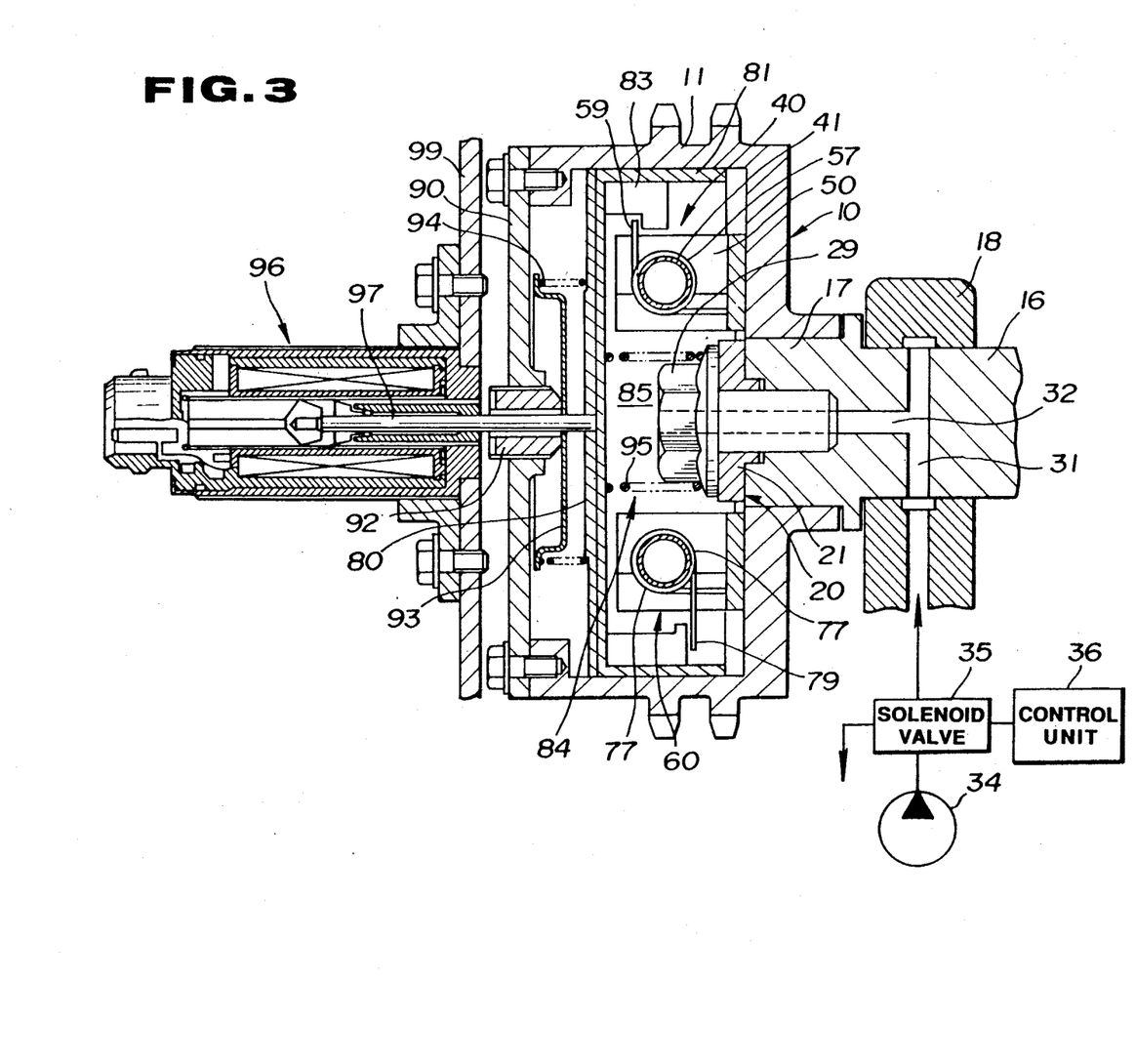
FIG. 3 is a fragmentary longitudinal sectional view used in explaining the neutral position of the slider used in the valve timing control apparatus of FIG. 1.

When the control unit 36 detects a maximum positive angle of rotation of the camshaft 16 with respect to the rotary drum 10 based upon the signals from the angular sensors, it produces a control signal causing the solenoid actuator 96 to be disconnected from the power source. As a result, the slider 80 is moved, under the resilient force of the compression spring 95, to its neutral position, as shown in FIG. 3, where the resilient forces of the compression springs 94 and 95 are balanced. In the neutral position, the first hook member 83 is out of engagement with the coil spring end 59 so that the coil spring 57 retains the piston rod 41 in its advanced position and thus retains the rocker arm 20 in a first position, as shown in FIG. 2, retarding the intake valve timing. Although the second hook member 84 is out of engagement with the coil spring end 79, the rocker arm 20 retains the piston rod 61 in its retracted position.

Figure 4:
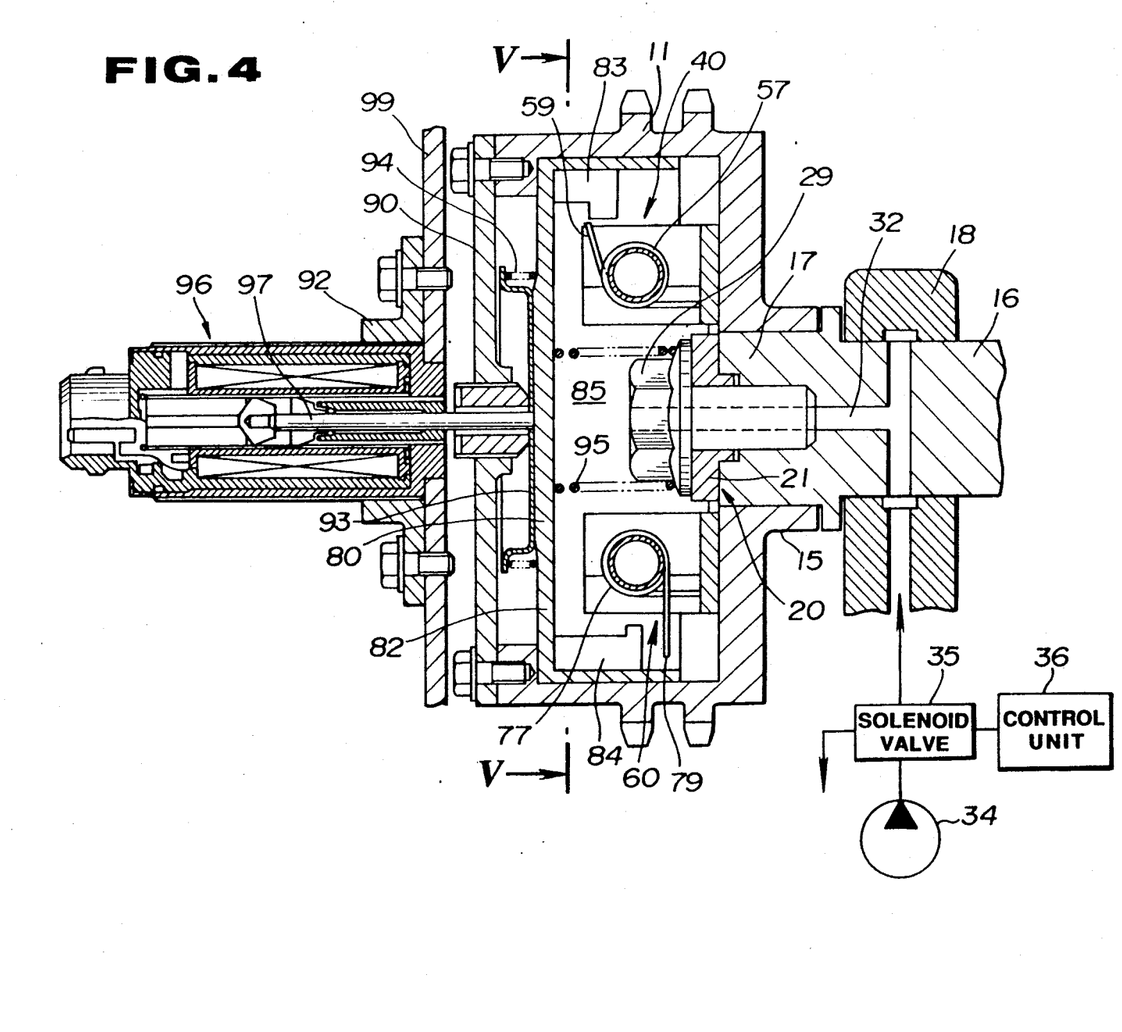
FIG. 4 is a fragmentary longitudinal sectional view used in explaining the retracted position of the slider used in the valve timing control apparatus of FIG. 1.

When the engine is operating at a high load condition, the control unit 36 produces a control signal causing the solenoid valve 35 to provide communication between the pressure chamber 85 and the pump 34. As a result, the working fluid is introduced into the pressure chamber 85 to move the slider 80 to a position, as shown in FIG. 4, where the second hook member 84 is out of engagement with the coil spring end 79 and the first hook member 83 pushes the coil spring end 59 in a direction loosing the coil spring 57. In this position, the piston rod 41 is free to slide with respect to the support member 50.

When each cam starts opening the corresponding intake valve, a torque is produced in the camshaft 16 to rotate the rocker arm 20 in a negative direction bringing the knocker 25 into abutment against the piston head 42. As a result, the piston rod 41 is retracted against the resilient force of the compression spring 45 until the piston head 42 comes in abutment with the front wall 52 since the coil spring 57 is loosed to allow free movement of the piston rod 41 with respect to the support member 50. The speed of the retracting movement of the piston rod 41 is limited by the flow resistance of the fluid passing the restriction orifice 55. This is effective to minimize noise and wear which may occur when the knocker 25 knocks the piston head 42. On the other hand, the resilient force of the compression spring 65 advances the piston rod 61, against the frictional force applied to the piston rod 61 by the coil spring 77, to bring the piston head 62 into abutment against the knocker 26. During this movement of the piston rod 61, the fluid flows from the pressure chamber 86 through the check valve 66 into the rear chamber.

When the cam starts closing the intake valve, the direction of the torque in the camshaft 16 is abruptly reversed to a positive direction. This sudden reversal of torque results in a force causing the knocker 26 to push the piston head 62 in a direction retracting the piston rod 61. With the retracting movement of the piston rod 61, the coil spring 77 moves, under the frictional force, and it is compressed to produce tensile stresses in a direction where the coil spring 77 is wound so as to increase the frictional force applied to the piston rod 61. This tendency is increased when the coil spring 77 moves into the cutout 76 and is deformed from an initial cylindrical shape into a conical shape. The frictional force applied to the piston rod 61 will increase as the force applied to the piston head 62 from the rocker arm 20 increases. This ensures that the coil spring 77 will prevent the piston rod 61 from retracting.

Figure 5:
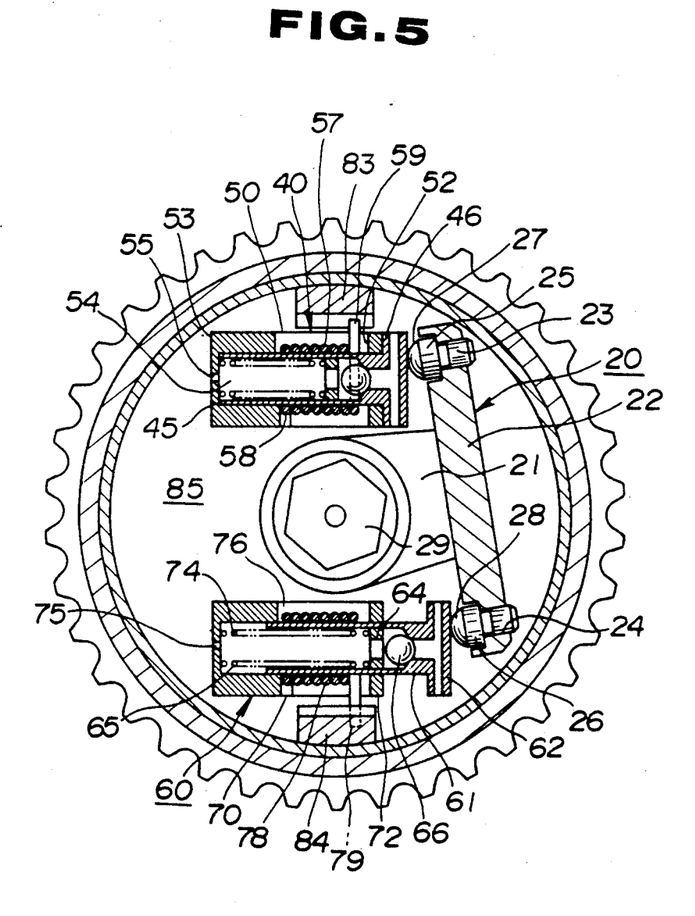
FIG. 5 is a transverse sectional view taken on line V—V of FIG. 4.

When the control unit 36 detects a maximum negative angle of rotation of the camshaft 16 with respect to the rotary drum 10 based upon the signals from the angular sensors, it produces a control signal causing the solenoid valve 35 to interrupt communication between the pressure chamber 85 and the pump 34. As a result, the slider 80 is moved, under the resilient force of the compression spring 94, to its neutral position, as shown in FIG. 3, where the resilient forces of the compression springs 94 and 95 are balanced. In the neutral position, the second hook member 84 is out of engagement with the coil spring end 79 so that the coil spring 77 retains the piston rod 61 in its advanced position and thus retains the rocker arm 20 in a second position, as shown in FIG. 5, advancing the intake valve timing. Although the first hook member 83 is out of engagement with the coil spring end 59, the rocker arm 20 retains the piston rod 41 in the retracted position.

When the engine is operating at an intermediate load condition, the control unit 36 produces a control signal causing the solenoid valve 35 to provide communication between the pressure chamber 85 and the pump 34 for a predetermined period of time or a control signal causing the solenoid actuator 96 to be connected to a power source for a predetermined period of time. As a result, the slider 80 is retarded or advanced a predetermined distance from its neutral position to loose one of the coil springs 57 and 77 so as to allow rotation of the camshaft 16 in a negative or positive direction. When the control unit 36 detects a desired angle of rotation of the camshaft 16 with respect to the rotary drum 10 based upon the signals from the angular sensors, it produces a control signal causing the solenoid valve 35 to interrupt the communication between the pressure chamber 85 and the pump 35 or a control signal causing the solenoid actuator 96 to be disconnected from the power source. As a result, the slider 80 is moved, under the resilient force of the compression spring 94 or 95, to its neutral position, as shown in FIG. 3, where the resilient forces of the compression springs 94 and 95 are balanced. In the neutral position, the rocker arm 20 is retained at a third position where the camshaft 16 is retained at the desired angle with respect to the rotary drum 10. This third position of the rocker arm 20 is intermediate between the first position, as shown in FIG. 2, and the second position, as shown in FIG. 5.

The solenoid valve 35 or the solenoid actuator 96 is disconnected from the power source as soon as the camshaft 16 arrives at a desired angle with respect to the rotary drum 10. This is effective to save unnecessary electric power consumption.

Figure 6:
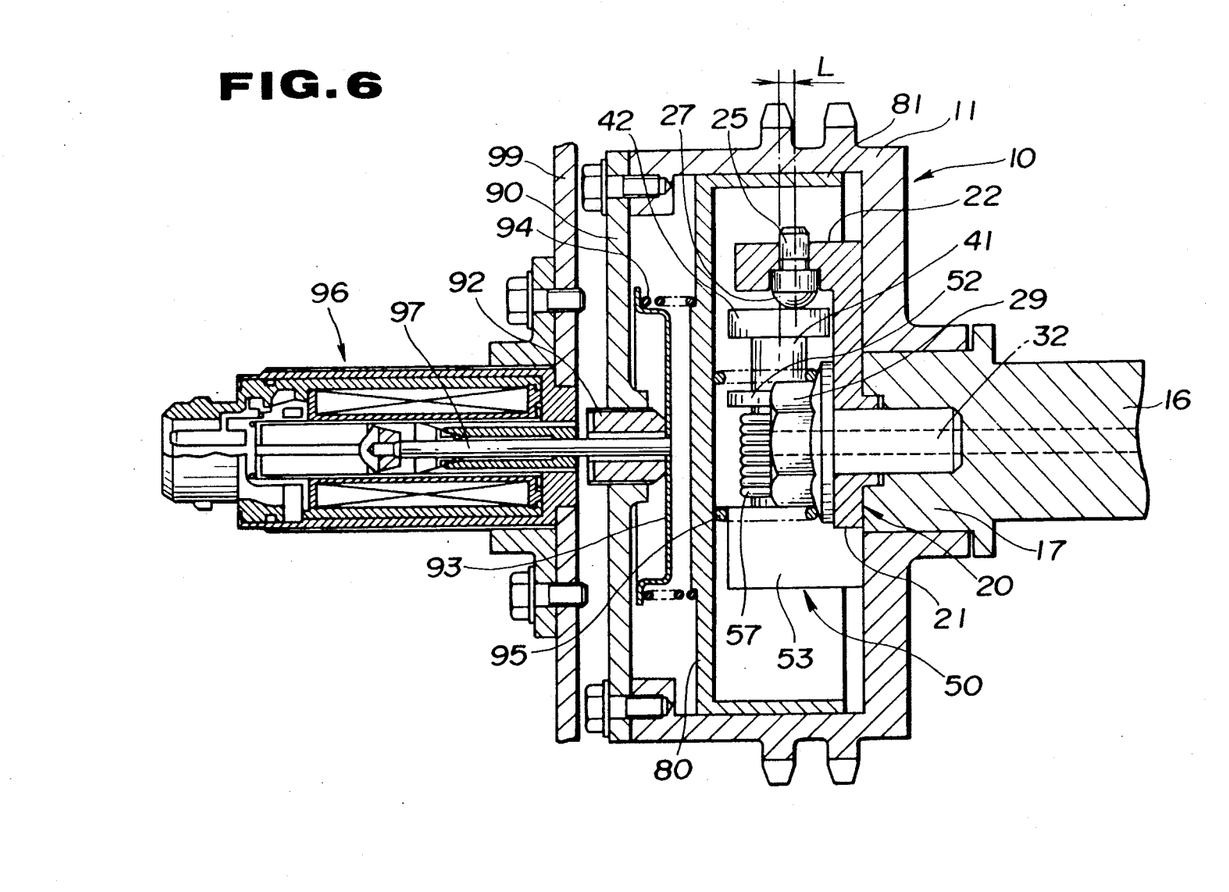
FIG. 6 is a fragmentary longitudinal sectional view showing a second embodiment of the valve timing control apparatus of the invention.

Referring to FIG. 6, there is shown a second embodiment of the valve timing control apparatus of the invention. In this embodiment, the knockers 25 and 26 have axes offset a distance L from the axes of the respective piston rods 41 and 61 so that the knockers 25 and 26 can knock the respective piston heads 42 and 62 at different points. This structure is effective to further reduce noise and wear which may occur when the knockers 25 and 26 knock the respective piston heads 42 and 62.

Although the invention has been described in connection with intake valve timing control, it is to be understood that the invention is equally applicable to control the exhaust valve timing. Although the invention has been described in connection with a hydraulic system used, along with a solenoid actuator, to move the slider, it is to be understood that the solenoid actuator may be used to retract and advance the slider. In this case, the hydraulic system is omitted.

What is claimed is:

1. A valve timing control apparatus for use in an internal combustion engine having a crankshaft driven by the engine and a camshaft adapted to drive at least one valve, comprising:

a rotary member drivingly connected to the crankshaft for rotation with the crankshaft;

a control unit responsive to engine operating conditions for calculating a desired angular position of the camshaft with respect to the rotary member; and a coupling mechanism for coupling the rotary member to the camshaft to transmit rotation of the rotary member to the camshaft, the coupling mechanism including means for setting the camshaft at the desired angular position with respect to the rotary member, the camshaft setting means making the setting in response to torque changes in the camshaft, said coupling mechanism including a rocker arm secured on the camshaft for rotation in unison with the camshaft, the rocker arm having first and second contact portions at its opposite ends; a first plunger supported on the rotary member for forward movement toward the first contact portion and rearward movement away from the first contact portion, said first plunger being urged toward the first contact portion; first clutch means movable between first and second positions, the first clutch means permitting the forward movement of the first plunger but preventing the rearward movement of the first plunger in the first position of the first clutch means, the first clutch means permitting the forward movement of the first plunger and the rearward movement of the first plunger in the second position of the first clutch means; a second plunger supported on the rotary member for forward movement toward the second contact portion and rearward movement away from the second contact portion, said second plunger being urged toward the second contact portion; and second clutch means movable between first and second positions, the second clutch means permitting the forward movement of the second plunger but preventing the rearward movement of the second plunger in the first position of the second clutch means, the second clutch means permitting the forward movement of the second plunger and the rearward movement of the second plunger in the second position of the second clutch means.

2. The valve timing control apparatus as claimed in claim 1, wherein the first clutch means includes a first coil spring fixed at its one end to the rotary member, the first coil spring being wound on the first plunger to provide a frictional force against movement of the first plunger, the first coil spring being compressed to provide an increased frictional force against the rearward movement of the first plunger in the first position of the first clutch means, and wherein the second clutch means includes a second coil spring fixed at its one end to the rotary member, the second coil spring being wound on the second plunger to provide a frictional force against movement of the second plunger, the second coil spring being compressed to provide an increased frictional force against the rearward movement of the second plunger in the first position of the second clutch means.

3. The valve timing control apparatus as claimed in claim 1, wherein the control unit includes means for moving one of the first and second clutch means to the first position thereof and the other clutch means to the second position thereof.

4. The valve timing control apparatus as claimed in claim 3, wherein the control unit includes means for detecting an angular position of the camshaft with respect to the rotary member, and means for moving the first and second clutch means to the respective first positions thereof when the crankshaft angular position reaches the desired angular position.

5. A variable valve timing control apparatus for use in an internal combustion engine having a crankshaft driven by the engine and a camshaft adapted to drive at least one valve, comprising:

an engine synchronous rotary member having a driven connection with the crankshaft, said rotary member encountering a relative angular displacement with respect to said camshaft due to torque changes in said camshaft; a control unit responsive to engine operating conditions for calculating a desired relative phase angle between said camshaft and said rotary member on the basis of the magnitude of a control parameter representative of said engine operating condition;

clutch means disposed between said rotary member and said camshaft for keeping said camshaft at said desired relative angular position with respect to said rotary member, said clutch means operating at three operational modes, namely a first mode wherein said clutch means permitting a relative angular displacement of said camshaft with respect to said rotary member based on said desired relative phase angle in a first displacement direction retarding a valve timing and mechanically interlocking said rotary member and said camshaft for preventing the relative angular displacement of said camshaft in a second displacement direction advancing a valve timing, a second mode wherein said clutch means permitting the relative angular displacement of said camshaft based on said desired relative phase angle in said second displacement direction and mechanically interlocking said rotary member and said camshaft for preventing the relative angular displacement of said camshaft in said first displacement direction, and a third mode wherein said clutch means mechanically interlocking said rotary member and said camshaft for preventing the relative angular displacement of said camshaft in both said first and second displacement directions;

means responsive to said desired relative phase angle, for switching the operational mode of said clutch means among said three operational modes, such that said switching means switching the clutch operational mode from said first or second mode to said third mode to hold a relative phase angle relationship between said rotary member and said camshaft, upon reaching to said desired relative phase angle via said first or second mode; and said clutch means including a pair of fluid-pressure operated plungers, each urged towards the associated end of a rocker arm fixed on the front end of said camshaft, a pair of mechanical clutches, each acting on the associated plunger for mechanically restricting a sliding movement of a selected one of said plungers;

whereby a continuous valve timing adjustment is performed depending on the magnitude of said control parameter representative of said engine operating condition.

6. A variable valve timing control apparatus for use in an internal combustion engine having a crankshaft driven by the engine and a camshaft adapted to drive at least one valve, comprising:

an engine synchronous rotary member having a driven connection with the crankshaft, said rotary member encountering a relative angular displacement with respect to said camshaft due to torque changes in said camshaft;

a control unit responsive to engine operating conditions for calculating a desired relative phase angle between said camshaft and said rotary member on the basis of the magnitude of a control parameter representative of said engine operating condition;

first and second mechanical clutch mechanisms disposed between said rotary member and said camshaft for keeping said camshaft at said desired relative angular position with respect to said rotary member, said first and second clutch mechanisms operating at a first mode wherein said second clutch mechanism permitting a relative angular displacement of said camshaft with respect to said rotary member based on said desired relative phase angle in a first displacement direction retarding a valve timing and said first clutch mechanism mechanically interlocking said rotary member and said camshaft for preventing the relative angular displacement of said camshaft in a second displacement direction advancing a valve timing, a second mode wherein said first clutch mechanism permitting the relative angular displacement of said camshaft based on said desired relative phase angle in said second displacement direction and said second clutch mechanism mechanically interlocking said rotary member and said camshaft for preventing the relative angular displacement of said camshaft in said first displacement direction, and a third mode wherein said first and second clutch mechanisms mechanically interlocking said rotary member and said camshaft for preventing the relative angular displacement of said camshaft in both said first and second displacement directions; and means responsive to said desired relative phase angle, for switching the operational mode of said first and second clutch mechanisms among said three operational modes, such that said switching means switching the clutch operational mode from said first or second mode to said third mode to hold a relative phase angle relationship between said rotary member and said camshaft, upon reaching to said desired relative phase angle via said first or second mode;

said switching means comprising:

a sliding piston disposed between said rotary member and said camshaft for engaging and disengaging said first and second clutch mechanisms via an axial sliding movement to achieve said three clutch operational modes;

an electromagnetic actuator associated with said sliding piston for providing one axial sliding movement of said sliding piston for engaging said first clutch mechanism and disengaging said second clutch mechanism so as to achieve said first mode;

a hydraulic circuit associated with said sliding piston for providing the opposing axial sliding movement of said sliding piston for disengaging said first clutch mechanism and engaging said second clutch mechanism so as to achieve said second mode;

spring means associates with said sliding piston for holding said slide piston in a neutral position when said electromagnetic actuator and said hydraulic circuit are inoperative, for engaging said first and second clutch mechanisms so as to achieve said third mode; and wherein said first clutch mechanism includes a first mechanical winding spring clutch, a pivotable arm secured on the front end of said camshaft for rotation in unison with said camshaft, a first plunger supported on said rotary member while keeping in contact with one end of said pivotable arm, and said second clutch mechanism includes a second mechanical winding spring clutch mechanism, said pivotable arm, a second plunger supported on said rotary member while keeping in contact with the other end of said pivotable arm, and the projecting movement of one of said first and second plungers is permitted by way of disengagement of the associated winding spring clutch, the retracting movement of the other plunger is restricted by way of engagement of the associated winding spring clutch, and both projecting and retracting movements of said first and second plungers are restricted by way of engagements of said first and second winding spring clutches;

whereby a continuous valve timing adjustment is performed depending on the magnitude of said control parameter representative of said engine operating condition.

7. The variable valve timing control apparatus as set forth in claim 6, wherein said winding spring clutch acts on the associated plunger in a manner so as to further increase its engaging force, in response to torque reversal acting in the direction preventing said relative angular displacement of said camshaft with respect to said rotary member, thereby assuring restriction of movement of said plunger.

* * * * *